(12) United States Patent
Dobbs et al.

(10) Patent No.: US 9,732,873 B2
(45) Date of Patent: Aug. 15, 2017

(54) VALVE SEAT APPARATUS FOR USE WITH FLUID VALVES

(71) Applicant: Fisher Controls International LLC, Marshalltown, IA (US)

(72) Inventors: Eric Robert Dobbs, Marshalltown, IA (US); Theodore Paul Geelhart, Conrad, IA (US); Timothy Arthur McMahon, Marshalltown, IA (US); Paul Taylor Alman, Marshalltown, IA (US); Yan Qiu, Tianjin (CN)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 15/053,884

(22) Filed: Feb. 25, 2016

(65) Prior Publication Data

US 2016/0178080 A1 Jun. 23, 2016

Related U.S. Application Data

(63) Continuation of application No. 13/599,762, filed on Aug. 30, 2012, now Pat. No. 9,303,773, which is a
(Continued)

(51) Int. Cl.
*F16K 27/04* (2006.01)
*F16K 3/24* (2006.01)

(52) U.S. Cl.
CPC ............ *F16K 27/041* (2013.01); *F16K 3/246* (2013.01); *Y10T 137/86734* (2015.04)

(58) Field of Classification Search
CPC ........... F16K 1/42; F16K 1/422; F16K 1/4227
(Continued)

(56) References Cited

U.S. PATENT DOCUMENTS

| 1,331,305 A | 2/1920 | Wilkinson |
| 1,465,349 A | 8/1923 | Cunningham et al. |

(Continued)

FOREIGN PATENT DOCUMENTS

| CN | 202418891 | 9/2012 |
| GB | 1561159 | 2/1980 |

(Continued)

OTHER PUBLICATIONS

Emerson Process Management, "Design EUD, EUT-2, EWD, and EWT-2 Valves," Sep. 1993, 14 pages.
(Continued)

*Primary Examiner* — Craig Schneider
*Assistant Examiner* — Kevin Barss
(74) *Attorney, Agent, or Firm* — Hanley, Flight & Zimmerman, LLC

(57) ABSTRACT

A valve seat apparatus for use with fluid valves is described. An example disclosed valve seat apparatus includes a seat ring having an outer surface that includes a first annular recess at a first end of the seat ring, where the first annular recess is to receive a portion of a cage, a second annular recess proximate a second end of the seat ring opposite the first end, and where the second annular recess defines a groove in the outer surface of the seat ring, and a third annular recess adjacent the second annular recess. The example disclosed valve seat apparatus also includes a first seal assembly disposed in the third annular recess and a retainer disposed in the second annular recess to retain the seal assembly in the third annular recess.

20 Claims, 9 Drawing Sheets

Related U.S. Application Data continuation of application No. PCT/CN2010/075607, filed on Jul. 30, 2010.

(58) Field of Classification Search
USPC .................................... 137/625.3, 360, 363
See application file for complete search history.

(56) References Cited

U.S. PATENT DOCUMENTS

| | | |
|---|---|---|
| 1,595,246 A | 8/1926 | Ragsdale |
| 2,192,339 A | 3/1940 | Wilson |
| 2,397,574 A | 4/1946 | Thonet |
| 4,130,285 A | 12/1978 | Whitaker |
| 4,834,133 A | 5/1989 | Lacoste et al. |
| 5,056,757 A | 10/1991 | Wood |
| 5,129,625 A | 7/1992 | Wood et al. |
| 5,247,960 A | 9/1993 | Kornfeldt et al. |
| 6,637,452 B1 | 10/2003 | Alman |
| 6,641,112 B2 | 11/2003 | Antoff et al. |
| 6,840,520 B2 | 1/2005 | Faas et al. |
| 6,974,121 B2 | 12/2005 | Koester et al. |
| 7,484,710 B2 | 2/2009 | Koester et al. |
| 7,854,239 B2 | 12/2010 | Wears et al. |
| 8,167,269 B2 | 5/2012 | Bell et al. |
| 9,267,604 B2 | 2/2016 | Bell |
| 9,297,469 B2 | 3/2016 | Bell |
| 9,303,773 B2 | 4/2016 | Dobbs et al. |
| 2002/0017327 A1 | 2/2002 | Kawaai et al. |
| 2003/0116920 A1 | 6/2003 | Friend et al. |
| 2003/0159737 A1 | 8/2003 | Stares |
| 2003/0226600 A1 | 12/2003 | Stares et al. |
| 2004/0145120 A1 | 7/2004 | Faas et al. |
| 2006/0048826 A1 | 3/2006 | Gossett et al. |
| 2006/0207666 A1 | 9/2006 | Micheel et al. |
| 2008/0012324 A1 | 1/2008 | Dole et al. |
| 2008/0264504 A1 | 10/2008 | Gossett et al. |
| 2009/0020720 A1 | 1/2009 | Davies, Jr. et al. |
| 2009/0057595 A1 | 3/2009 | Micheel et al. |
| 2009/0127488 A1 | 5/2009 | McCarty et al. |
| 2009/0218536 A1 | 9/2009 | Wears et al. |
| 2010/0044613 A1 | 2/2010 | Gossett et al. |
| 2010/0288954 A1 | 11/2010 | Czimmek et al. |
| 2010/0301240 A1 | 12/2010 | Bell et al. |
| 2010/0301253 A1 | 12/2010 | Perrault et al. |
| 2011/0012046 A1 | 1/2011 | Bell |
| 2011/0179911 A1 | 7/2011 | Whitehead |
| 2012/0319027 A1 | 12/2012 | Dobbs et al. |
| 2014/0264135 A1 | 9/2014 | Bell |
| 2014/0264138 A1 | 9/2014 | Bell |
| 2016/0076653 A1 | 3/2016 | Bell |

FOREIGN PATENT DOCUMENTS

| | | |
|---|---|---|
| GB | 2318315 | 4/1988 |
| JP | 2005147213 | 6/2005 |
| JP | 2009523968 | 6/2009 |
| TW | M439662 | 10/2012 |
| WO | 2007081640 | 7/2007 |
| WO | 2009012168 | 1/2009 |
| WO | 2009105405 | 8/2009 |
| WO | 2012012951 | 2/2012 |

OTHER PUBLICATIONS

Emerson Process Management, "Designs FB and FBG Control Valves," Jan. 1993, 8 pages.
Emerson Process Management, "Fisher ED, EAD, and EDR Sliding-Stem Control Valves," Dec. 2012, 24 pages.
Emerson Process Management, "Fisher EU and EW Valves NPS 12 through 24×20," Jul. 2014, 24 pages.
Emerson Process Management, "Fisher EZ-C, ET-C, and EWT-C Cryogenic Sliding-Stem Control Valves," Oct. 2014, 24 pages.
Emerson Process Management, "Fisher FB Control Valve," Sep. 2014, 12 pages.
Emerson Process Management, "Inverted Globe Valve Applications," Oct. 2001, 5 pages.
International Searching Authority, "International Search Report", issued in connection with PCT Application No. PCT/US2014/022251, mailed on Jul. 10, 2014, 2 pages.
International Searching Authority, "International Search Report," issued in connection with PCT Application No. PCT/CN2010/075607, mailed on May 5, 2011, 5 pages.
International Searching Authority, "International Search Report," issued in connection with PCT Application No. PCT/US2014/022255, mailed on Nov. 4, 2014, 4 pages.
International Searching Authority, "Invitation to Pay Additional Fees and, Where Applicable, Protest Fee," issued in connection with PCT Application No. PCT/US2014/022255, mailed on Jul. 10, 2014, 4 pages.
International Searching Authority, "Written Opinion," issued in connection with PCT Application No. PCT/US2014/022251, mailed on Jul. 10, 2014, 6 pages.
International Searching Authority, "Written Opinion," issued in connection with PCT Application No. PCT/CN2010/075607, on May 5, 2011, 5 pages.
International Searching Authority, "Written Opinion," issued in connection with PCT Application No. PCT/US2014/022255, mailed on Nov. 4, 2014, 10 pages.
Japanese Patent Office, English version of "Notice of Reasons for Refusal," issued in connection with Japanese Patent Application No. 2013-520943, mailed on Jun. 11, 2014, 8 pages.
Patent Cooperation Treaty, "International Preliminary Report on Patentability," issued in connection with PCT Application No. PCT/US2014/022251, mailed on Sep. 15, 2015, 7 pages.
Patent Cooperation Treaty, "International Preliminary Report on Patentability," issued in connection with PCT Application No. PCT/US2014/022255, mailed on Sep. 15, 2015, 12 pages.
The State Intellectual Property Office of the People's Republic of China, English version of "Notification of the First Office Action," issued in connection with Chinese Patent Application No. 201080068351.6, mailed on Apr. 14, 2014, 25 pages.
The State Intellectual Property Office of the People's Republic of China, English version of "Notification of the Second Office Action," issued in connection with Chinese Patent Application No. 201080068351.6, mailed on Nov. 15, 2014, 6 pages.
United States Patent and Trademark Office, "Final Office Action," issued in connection with U.S. Appl. No. 13/828,539, mailed on Aug. 21, 2015, 54 pages.
United States Patent and Trademark Office, "Non-Final Office Action," issued in connection with U.S. Appl. No. 13/828,539, mailed on Apr. 6, 2015, 25 pages.
United States Patent and Trademark Office, "Non-Final Office Action," issued in connection with U.S. Appl. No. 13/895,973, mailed on May 8, 2015, 24 pages.
United States Patent and Trademark Office, "Non-Final Office Action," issued in connection with U.S. Appl. No. 13/895,973, mailed on Oct. 8, 2015, 14 pages.
United States Patent and Trademark Office, "Notice of Allowance," issued in connection with U.S. Appl. No. 13/828,539, Nov. 2, 2015, 17 pages.
United States Patent and Trademark Office, "Notice of Allowance," issued in connection with U.S. Appl. No. 13/895,973, Nov. 20, 2015, 15 pages.
United States Patent and Trademark Office, "Restriction Requirement," issued in connection with U.S. Appl. No. 13/895,973, mailed on Jan. 30, 2015, 5 pages.
United States Patent and Trademark Office, "Non-Final Office Action," issued in connection with U.S. Appl. No. 13/599,762, mailed on Jul. 26, 2013, 36 pages.
United States Patent and Trademark Office, "Final Office Action," issued in connection with U.S. Appl. No. 13/599,762, mailed on Feb. 6, 2014, 33 pages.
United States Patent and Trademark Office, "Advisory Action," issued in connection with U.S. Appl. No. 13/599,762, mailed on Apr. 28, 2014, 6 pages.

(56) References Cited

OTHER PUBLICATIONS

United States Patent and Trademark Office, "Non-Final Office Action," issued in connection with U.S. Appl. No. 13/599,762, mailed on Sep. 12, 2014, 35 pages.

United States Patent and Trademark Office, "Final Office Action," issued in connection with U.S. Appl. No. 13/599,762, mailed on Mar. 5, 2015, 27 pages.

United States Patent and Trademark Office, "Advisory Action," issued in connection with U.S. Appl. No. 13/599,762, mailed on Jun. 24, 2015, 5 pages.

United States Patent and Trademark Office, "Non-Final Office Action," issued in connection with U.S. Appl. No. 13/599,762, mailed on Jul. 23, 2015, 17 pages.

United States Patent and Trademark Office, "Notice of Allowance," issued in connection with U.S. Appl. No. 13/599,762, Nov. 25, 2015, 12 pages.

United States Patent and Trademark Office, "Non-Final Office Action," issued in connection with U.S. Appl. No. 14/950,746, mailed on Apr. 8, 2016, 28 pages.

U.S., "Final Office Action," issued in connection with U.S. Appl. No. 14/950,746, dated Oct. 21, 2016 (14 pages).

VALVE SEAT APPARATUS FOR USE WITH FLUID VALVES

RELATED APPLICATIONS

This patent arises as a continuation of U.S. patent application Ser. No. 13/599,762, entitled "VALVE SEAT APPARATUS FOR USE WITH FLUID VALVES" filed on Aug. 30, 2012, which claims priority to International Application Serial Number PCT/CN2010/075607 also entitled "VALVE SEAT APPARATUS FOR USE WITH FLUID VALVES" filed on Jul. 30, 2010, both of which are incorporated herein by reference in their entireties.

FIELD OF THE DISCLOSURE

This disclosure relates generally to valves and, more particularly, to valve seat apparatus for use with fluid valves.

BACKGROUND

Valves are commonly used in process control systems to control the flow of process fluids. Sliding stem valves (e.g., a gate valve, a globe valve, a diaphragm valve, a pinch valve, etc.) typically have a closure member (e.g., a valve plug) disposed in a fluid path. A valve stem operatively couples the closure member to an actuator that moves the closure member between an open position and a closed position to allow or restrict fluid flow between an inlet and an outlet of the valve. Additionally, to provide a desired and/or to achieve certain flow characteristics of the fluid, valves often employ a cage that interposes in the path of fluid flow between the inlet and the outlet of the valve. A cage can reduce capacity flow, attenuate noise, and/or reduce or eliminate cavitation.

Typically, the size of the valve, industrial process conditions such as operational temperatures (e.g., temperatures between −100° F. and 450° F., temperatures greater than 450° F., etc.) of the process fluids are used to determine the type of valve or valve components that may be used such as, for example, the types of seals that may be used to effect a seal between a cage, a valve seat, a valve body and/or a closure member.

Further, the type of seals that are used usually determines the valve seat/seal configuration. For example, to provide a seal between a valve seat and a valve body, a seal composed of, for example, polytetrafluoroethylene (e.g., PTFE or Teflon®) is typically disposed between a valve seat and a valve body for process fluids having temperatures less than 450° F. For example, the seal may be disposed within an annular recess formed around an outer peripheral surface of the valve seat. The valve seat is coupled to a cage (e.g., via threads), which suspends the valve seat within a fluid flow path of the valve body when the cage is coupled to the valve body. The seal prevents fluid leakage between the valve body and the valve seat. However, process fluids having temperatures greater than 450° F. may cause a seal composed of polytetrafluoroethylene to extrude or fail.

For process fluids having temperatures greater than 450° F., a valve seat/seal configuration includes a gasket disposed between the valve seat and the valve body. However, such a valve seat/seal configuration requires the valve seat to be fastened (e.g., bolted) to the valve body. Thus, a valve seat/seal configuration of a valve for use with process fluids having temperatures greater than 450° F. uses a valve body that is different than a body of a valve having a valve seat/seal configuration for use with process fluid having temperatures less than 450° F.

SUMMARY

An example valve seat apparatus described herein includes a seat ring having an outer surface that includes a first annular recess at a first end of the seat ring, where the first annular recess is to receive a portion of a cage, a second annular recess proximate a second end of the seat ring opposite the first end, and where the second annular recess defines a groove in the outer surface of the seat ring, and a third annular recess adjacent the second annular recess. The example valve seat apparatus also includes a first seal assembly disposed in the third annular recess and a retainer disposed in the second annular recess to retain the seal assembly in the third annular recess.

An example valve apparatus includes a valve body defining a fluid flow passageway between an inlet and an outlet, and a valve seat coupled to a cage at a first end of the valve seat and disposed within the fluid flow passageway, where an outer peripheral surface of the valve seat at a second end of the valve seat opposite the first end includes a seal receiving area and a retainer receiving area, the seal receiving area and the retainer receiving area having different diameters. The example valve apparatus also includes a first interchangeable seal to be retained in the seal receiving area and a retainer to be coupled to the retainer receiving area to retain the first interchangeable seal.

An example valve seat includes a body defining an inner and outer diameter, the body having a first end and a second end opposite the first end, a first annular recess to receive an end of a trim cage, where the first annular recess at least partially defines the first end of the body, and a second annular recess to receive a retainer, the second annular recess at least partially defining the second end of the body. The example valve seat includes a third annular recess proximate the second annular recess to receive an interchangeable seal assembly, where the first and second annular recesses define a step profile at the second end.

DETAILED DESCRIPTION

The example valve seat apparatus described herein may be used with valves having a sliding stem such as, for example, control valves, throttling valves, etc., which include a valve trim arrangement (e.g., a cage). In general, the example valve seat apparatus described herein provide a modular valve seat that enables interchangeability between different types of sealing assemblies for use with process fluids of widely varying temperatures (e.g., −325° F. to 1100° F.). As a result of the interchangeability provided by the valve seat apparatus described herein, fewer total components are needed to provide a greater variety of seal configurations for fluid valves that can be used with a wide range of process fluid temperatures. In other words, with the example valve seat apparatus described herein, it is not necessary to manufacture and inventory each possible combination of valve seat configuration, cage configuration and/or valve body configuration as is typically required with known valve seat designs. Thus, the valve seat apparatus described herein enables manufacturing of a single valve body that can receive the valve seat apparatus when used with the different sealing assemblies or configurations.

More specifically, the valve seat apparatus described herein may receive a first seal assembly for use with process fluids having a first temperature range, for example, between about −100° F. or lower and 450° F., a second seal assembly for use with process fluids having a second temperature range, for example, between about 450° F. and 600° F., or a third seal assembly for use with process fluids having a third temperature range, for example, between about 600° F. and 1100° F. For example, the first seal assembly may include a polytetrafluoroethylene or Ultra high molecular weight polyethylene seal, the second seal assembly may include a PTFE seal and an anti-extrusion ring, and the third seal assembly may include a bore seal (e.g., a metal seal such as a C-seal). In the described examples, a retainer retains the seal assembly with the valve seat apparatus. Further, in the examples, the valve seat apparatus is coupled to a cage, which suspends the valve seat, the seal assembly and the retainer within a valve body when the cage is coupled to the valve body.

Figure 1:
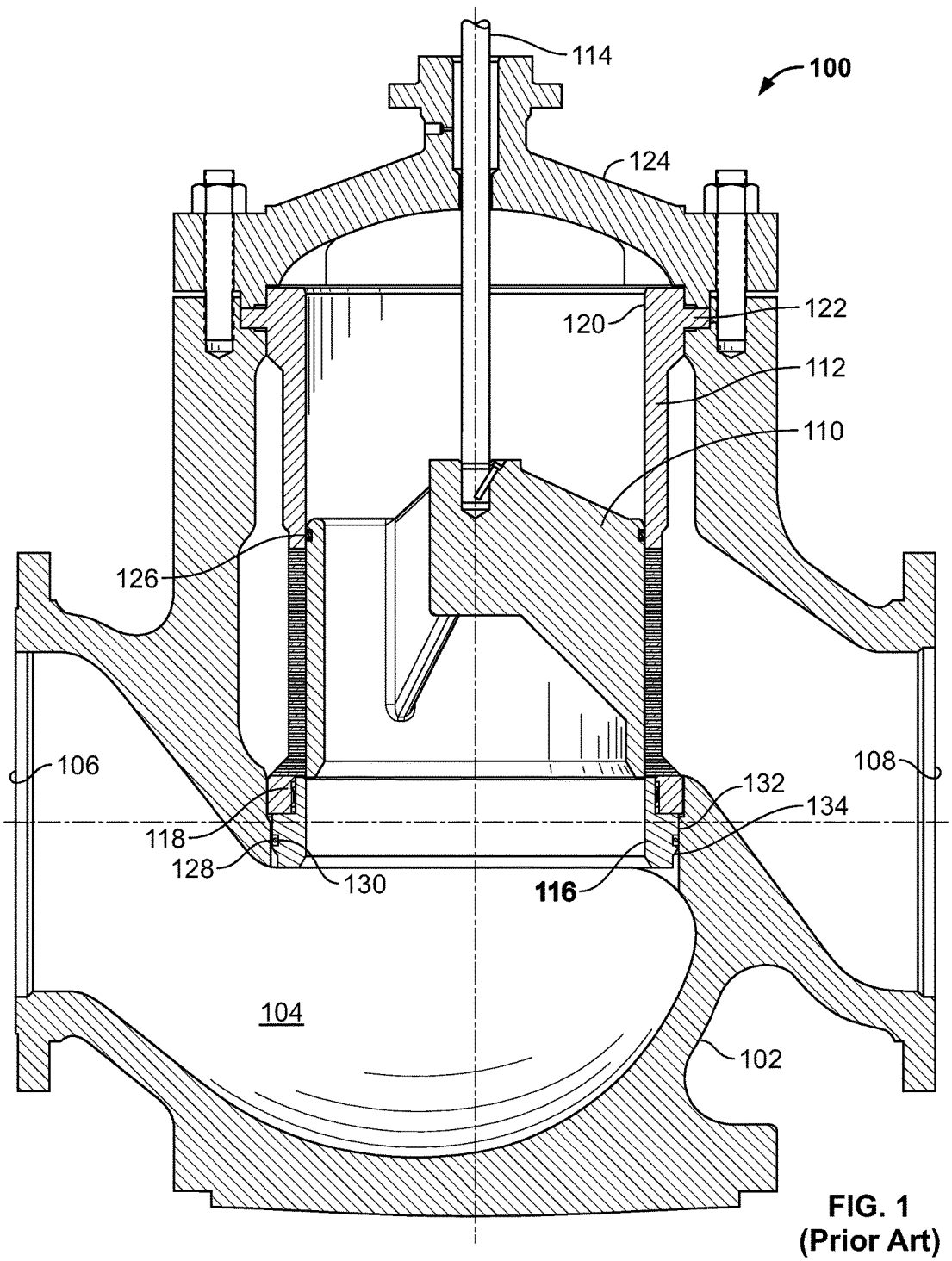
FIG. 1 is a cross-sectional view of a known valve implemented with a known sealing assembly.

Before discussing an example valve seat apparatus in detail, a brief description of a known fluid valve 100 is provided below in connection with FIG. 1. The fluid valve 100 illustrated in FIG. 1 includes a valve body 102 that defines a fluid flow passageway 104 between an inlet 106 and an outlet 108. A valve plug 110 is slidably disposed within a cage 112 and moves between an open position and a closed position to control the fluid flow through the fluid valve 100. A valve stem 114 couples the valve plug 110 to an actuator (not shown), which moves the valve plug 110 toward and away from a valve seat 116. The valve seat 116 is coupled to a first end 118 of the cage 112 (e.g., via threads) and a second end 120 of the cage 112 includes a flange 122 disposed between the valve body 102 and a bonnet 124. When coupled to the valve body 102, the cage 112 suspends or retains the valve seat 116 within the valve body 102.

In operation, an actuator moves the valve plug 110 away from the valve seat 116 to allow fluid flow through the fluid valve 100 (e.g., the open position) and toward the valve seat 116 to restrict fluid flow through the fluid valve 100. The valve plug 110 sealingly engages the valve seat 116 to prevent fluid flow through the fluid valve 100 (e.g., the closed position). A plug seal assembly 126 prevents fluid leakage between the valve plug 110 and the cage 112 when the fluid valve 100 is in the closed position (i.e., when the valve plug 110 sealingly engages the valve seat 116) as shown in FIG. 1.

Further a seal 128 composed of an elastomeric material such as a polytetrafluoroethylene is disposed within a channel or annular recess 130 formed at an outer peripheral surface 132 of the valve seat 116. The valve seat 116 includes a tapered edge or surface 134 (e.g., a chamfered or lead-in surface or edge) to enable or facilitate assembly of the seal 128 with the valve seat 116. The seal 128 (e.g., an O-ring) prevents fluid leakage between the valve seat 116 and the valve body 102. Because the seal 128 is composed of a polytetrafluoroethylene material, the example fluid valve 100 of FIG. 1 may be used with process fluids having temperatures between about −100° F. and 450° F. Process fluids having temperatures greater than 450° F. may cause the seal 128 to extrude and/or disintegrate.

Figure 2A:
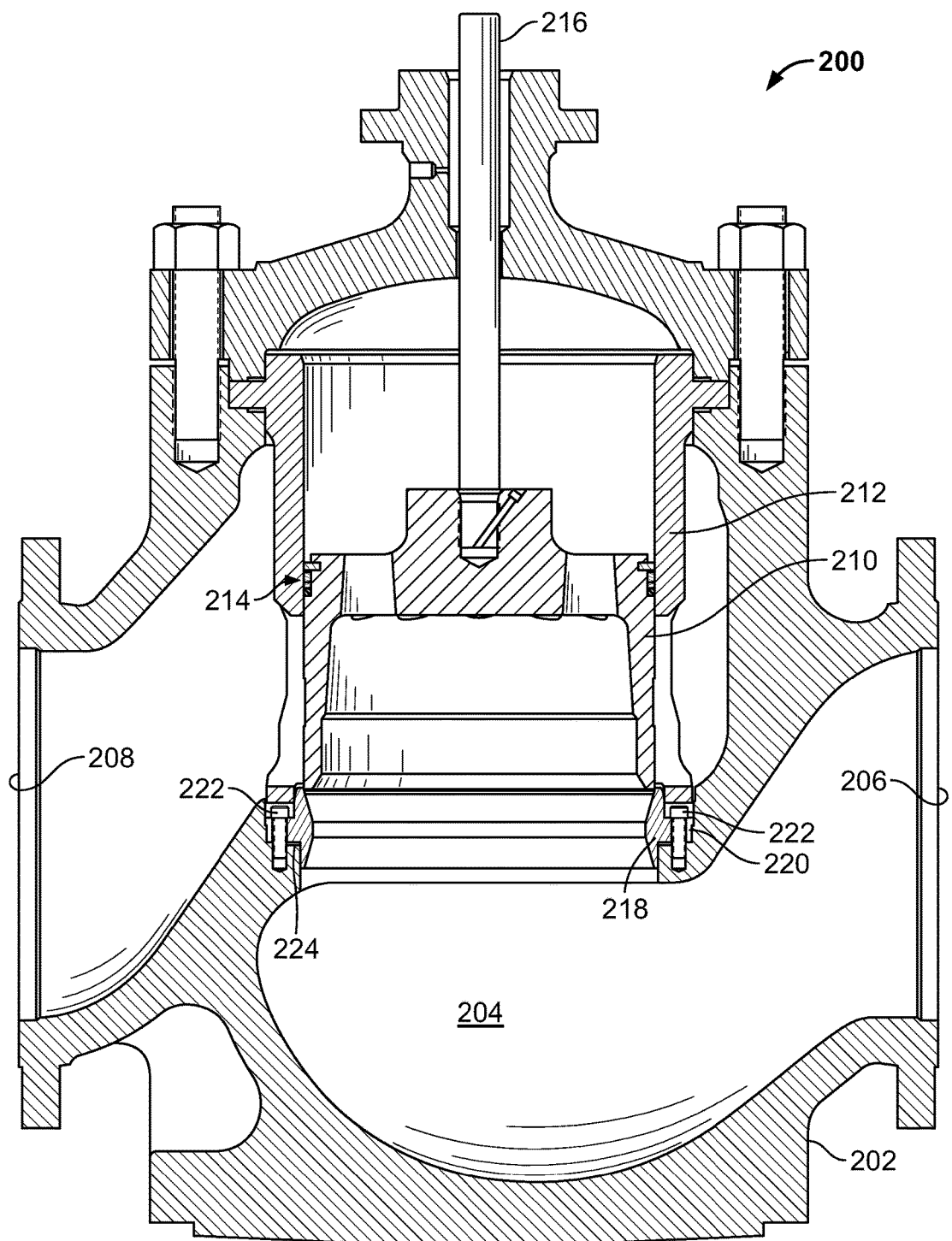
FIG. 2A is a cross-sectional view of another known valve implemented with another known sealing assembly.

FIG. 2A illustrates another known valve 200 that may be used with process fluids having temperatures between about 325° F. and 600° F. The fluid valve 200 illustrated in FIG. 2A includes a valve body 202 that defines a fluid flow passageway 204 between an inlet 206 and an outlet 208. A valve plug 210 is slidably disposed within a cage 212 and moves between an open position and a closed position to control the fluid flow through the fluid valve 200. The valve plug 210 includes a seal assembly 214 to provide a seal between the valve plug 210 and the cage 212. A valve stem 216 couples the valve plug 210 to an actuator (not shown), which moves the valve plug 210 toward and away from a valve seat 218. The valve seat 218 includes a flange 220 (e.g., an annular flange) that receives a plurality of fasteners 222 (e.g., bolts) to couple to the valve seat 218 to the valve body 202. A gasket 224 is disposed between the valve seat 218 and the valve body 202 to reduce or prevent fluid leakage between the valve seat 218 and the valve body 202.

The valve seat and valve body configuration shown in FIG. 2A is typically used with process fluid having temperatures between about 450° F. and 600° F. In applications where process fluid temperatures are between about 450° F. and 600° F., a seal made of an elastomeric material (e.g., polytetrafluoroethylene or PTFE) is not typically used to provide a seal between the valve seat 218 and the valve body 202 because it may extrude or disintegrate due to the temperature of the process fluid Additionally, in applications where process fluid temperatures are between −325° F. and −100° F., a seal made of an elastomeric material is not typically used to provide a seal between the valve seat 218 and the valve body 202 because the seal is too brittle. Also, the valve seat 218 and the valve body 202 of the fluid valve 200 are configured differently than the valve seat 116 and the valve body 102 of the fluid valve 100 of FIG. 1.

Figure 2B:
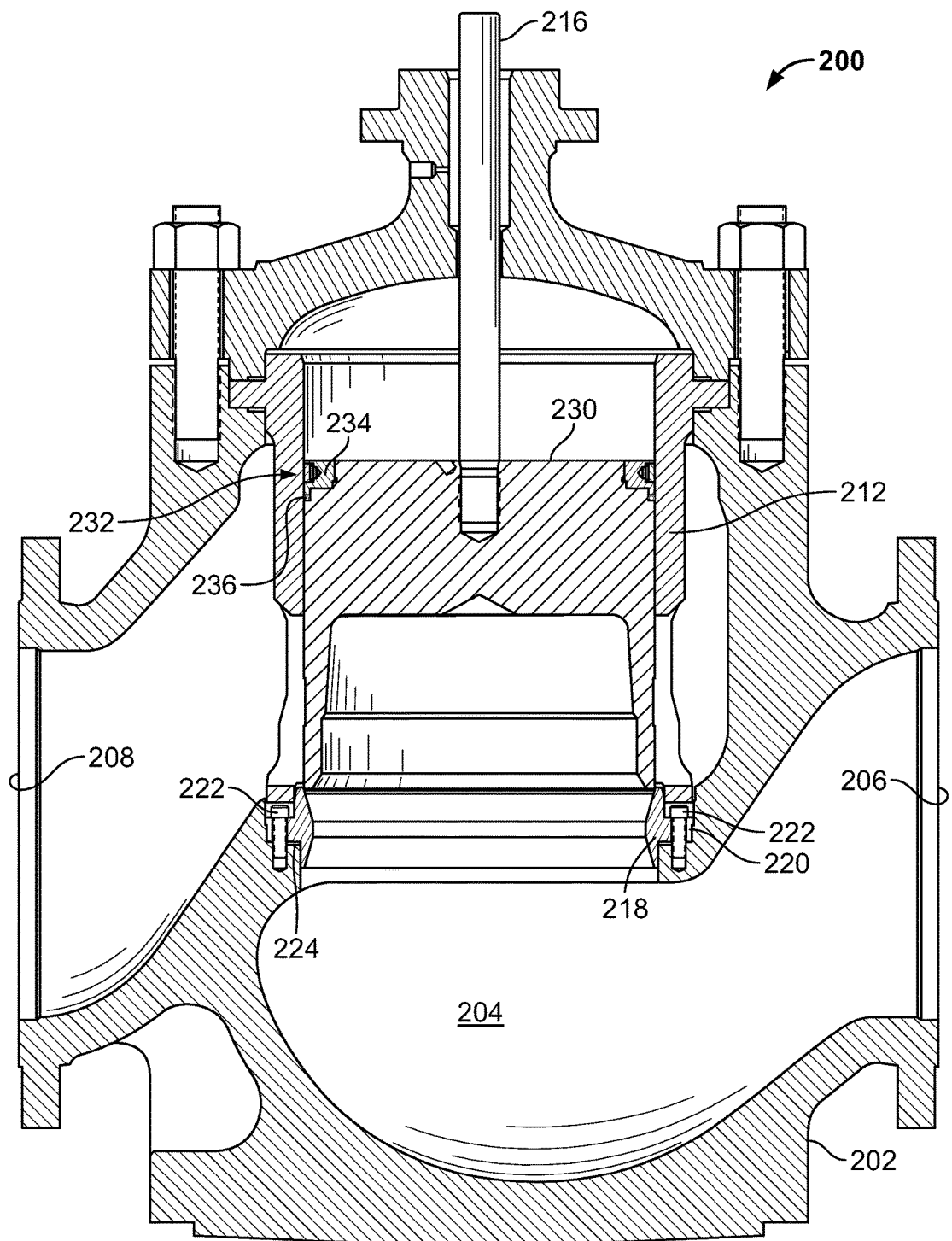
FIG. 2B is a cross-sectional view of another known valve implemented with another known sealing assembly.

FIG. 2B illustrates the valve 200 of FIG. 2A that is implemented with a closure member 230 having a seal assembly 232 for use with process fluids having a temperature range between about 600° F. and 1100° F. In this example, the seal assembly 232 of the closure member 230 includes a graphite piston ring 234 and a bore seal 236 (e.g., a C-shaped seal) that is made of metal or any other material to provide relatively high resistance to leakage of process fluid around or past the closure member 230 between the closure member 230 and the cage 212 (or the valve body 202) for process fluids having relatively high temperatures (e.g., temperatures greater than about 600° F.).

Thus, as a result, different configurations using multiple or different valve body and valve seat configurations are needed to accommodate different process fluid temperature ranges, resulting in larger inventories and increased manufacturing costs.

Figure 3:
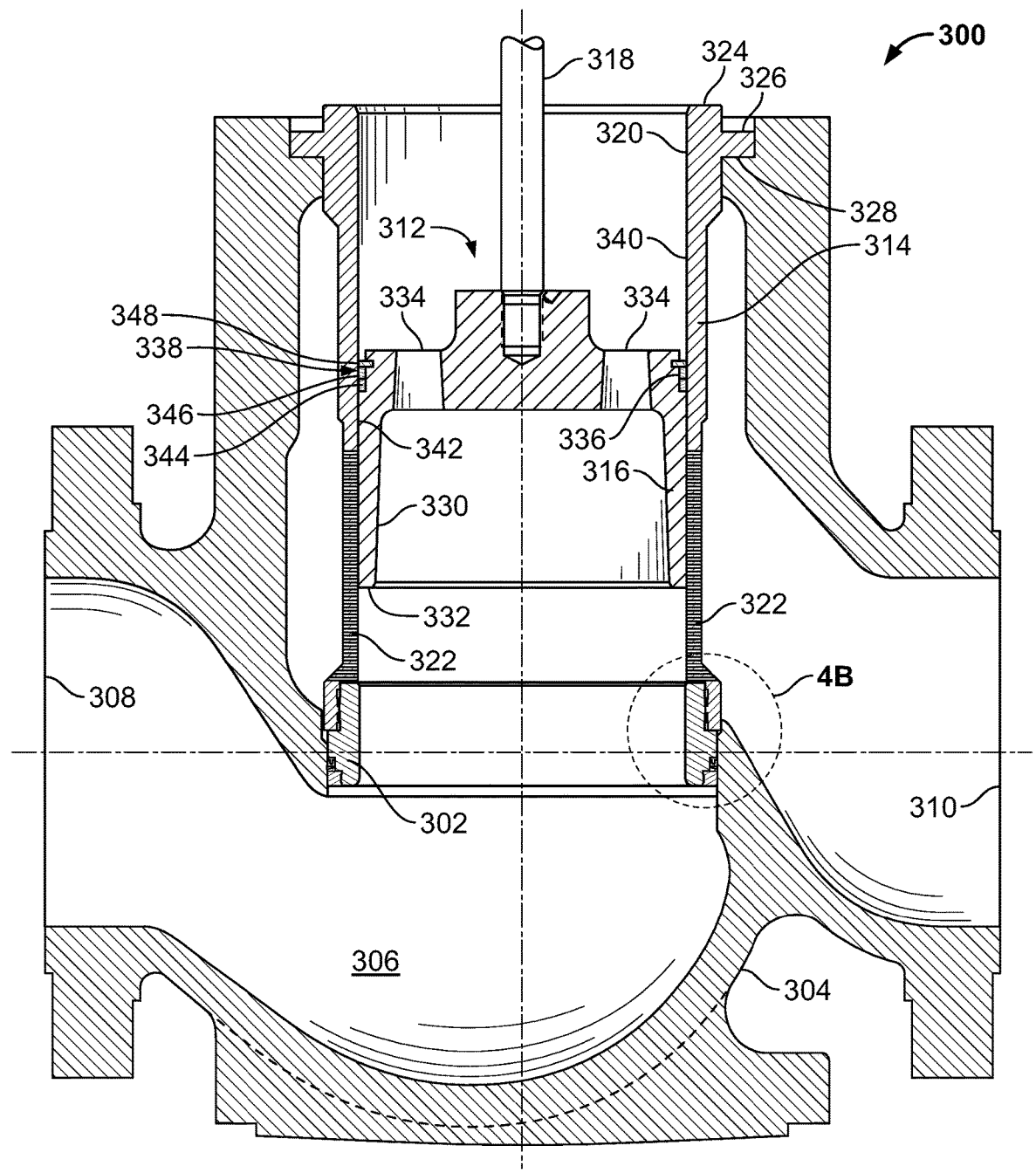
FIG. 3 is a cross-sectional view of a valve implemented with an example valve seat apparatus described herein.
Figure 4A:
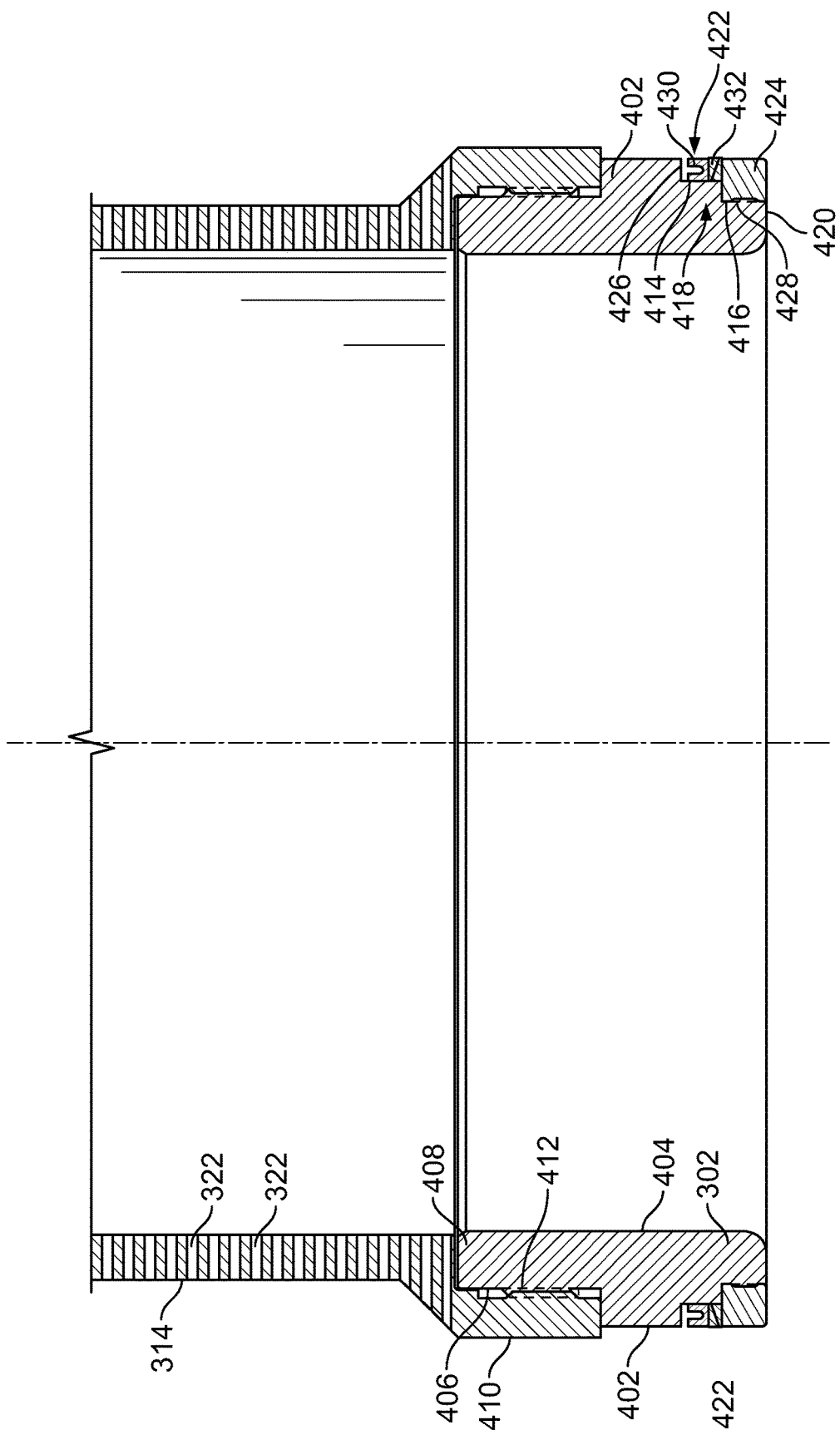
FIGS. 4A and 4B are enlarged portions of the example valve seat apparatus of FIG. 3.
Figure 4B:
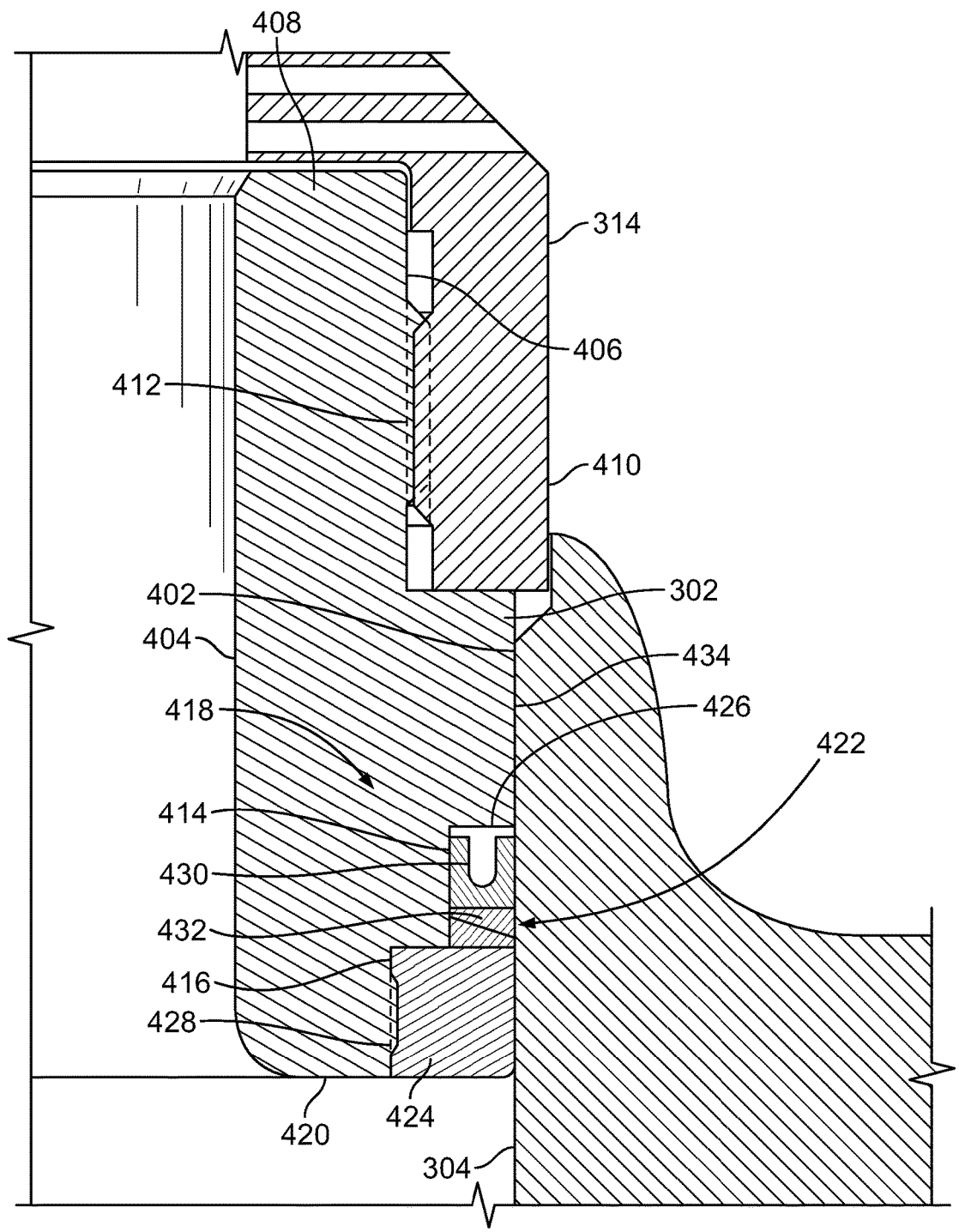

FIG. 3 illustrates an example fluid valve 300 implemented with an example valve seat apparatus 302. FIGS. 4A and 4B illustrate an enlarged view of the example fluid valve 300 of FIG. 3. The example fluid valve 300 may receive seal assemblies that may be used in applications having process fluid temperatures between about −325° F. and 1100° F. or higher.

Referring to FIG. 3, the fluid valve 300 includes a valve body 304 defining a fluid flow pathway 306 between an inlet 308 and an outlet 310. A valve trim assembly 312 interposes in the fluid flow passageway 306 to control the fluid flow between the inlet 308 and the outlet 310. The valve trim assembly 312 includes internal components of the fluid valve 300 such as, for example, a cage 314, a closure member 316 (e.g., a valve plug), the valve seat 302 and a valve stem 318.

The cage 314 is disposed between the inlet 308 and the outlet 310 to provide certain fluid flow characteristics through the valve body 304 (e.g., reduce noise and/or cavitation generated by the flow of fluid through the fluid valve 300). The cage 314 includes a bore 320 to receive (e.g., slidably receive) the closure member 316 and at least one opening 322 through which fluid can flow when the fluid valve 300 is in an open position (i.e., when the closure member 316 is spaced away from the valve seat 302). The cage 314 can be configured in different manners (e.g., the openings 322 having various shapes, sizes or spacing) to provide particular, desirable fluid flow characteristics of the fluid such as, for example, to control the flow, reduce noise and/or cavitation, to enhance pressure reductions of the process fluid, etc.

In the illustrated example, the cage 314 is a substantially unitary structure. A first end 324 of the cage 314 includes a flange 326 that engages a surface 328 of the valve body 304. A bonnet (not shown)(e.g., the bonnet 124 of FIG. 1) engages the flange 326 to retain the cage 314 within the valve body 304. When the cage 314 is coupled to the valve body 304, the cage 314 suspends or retains the valve seat 302 within the valve body 304. Thus, the cage 314 can also facilitate maintenance, removal, and/or replacement of the other components of the valve trim assembly 312.

The cage 314 guides the closure member 316 and provides lateral stability, balance, and alignment as the closure member 316 moves between the open position and a closed position, thereby reducing vibrations and other mechanical stress. The closure member 316 closely fits within the bore 320 and can slide within the cage 314 between the closed position, in which the closure member 316 obstructs the openings 322 of the cage 314, and the open position, in which the closure member 316 is clear of (i.e., does not block) at least a portion of the openings 322.

In the illustrated example, the closure member 316 is depicted as a valve plug having a cylindrical body 330 and a sealing surface 332. However, in other examples, the closure member 316 may be a disk or any other structure to vary the flow of fluid through the fluid valve 300. The valve stem 318 operatively couples the closure member 316 to an actuator (not shown). In this example, the closure member 316 includes channels or conduits 334 to balance or equalize the forces exerted across the closure member 316 by the pressures of the process fluid acting across the closure member 316. As a result, a smaller actuating force can be provided to move the closure member 316 between the open and closed positions. The closure member 316 also includes a recessed portion 336 to receive a plug seal assembly 338. The plug seal assembly 338 engages an inner surface 340 of the cage 314 to prevent fluid from leaking between the cage 314 and an outer surface 342 of the closure member 316. The plug seal assembly 338 includes a seal member 344 (e.g., an O-ring) composed of an elastomeric material and an anti-extrusion ring 346. The anti-extrusion ring 346 prevents the seal member 344 from extruding between the outer surface 342 of the closure member 316 and the inner surface 340 of the cage 314 when the process fluid temperature is between about 450° F. and 600° F. The plug seal assembly 338 may also include a backing ring or piston ring 348.

As most clearly shown in FIGS. 4A and 4B, the valve seat 302 is a seat ring having outer peripheral edge or surface 402 and an inner surface 404 (e.g., the inner surface 404 defining an orifice). The outer surface 402 includes a first recess portion or shoulder 406 adjacent a first end 408 of the valve seat 302 to receive a portion or second end 410 of the cage 314. In this example, the first end 408 of the valve seat 302 is coupled to the second end 410 of the cage 314 via threads 412.

The outer surface 402 of the valve seat 302 also includes a first annular recess or seal receiving area 414 and a second annular recess or retainer receiving area 416 adjacent the seal receiving area 414 to define or form a stepped portion 418 (e.g., via machining). The retainer receiving area 416 is adjacent a second end 420 of the valve seat 302. A seal assembly 422 is disposed within the seal receiving area 414 of the valve seat 302 and a retainer 424 is disposed within the retainer receiving area 416 to retain the seal assembly 422 between a shoulder or wall 426 of the stepped portion 418 and the retainer 424. As shown in this example, the retainer 424 is coupled to the retainer receiving area 416 of the valve seat 302 via threads 428. When coupled to the valve seat 302, the retainer 424 and the shoulder 426 define a cavity to receive the seal assembly 422.

The seal assembly 422 includes a seal 430 (e.g., an O-ring) composed of an elastomeric or fluropolymer such as, for example polytetrafluoroethylene. An anti-extrusion ring 432 (e.g., a hard plastic) provides additional sealing to prevent the seal 430 from extruding between the valve seat 302 and the valve body 304 when the fluid valve 300 is used with process fluids having temperatures between about 450° F. and 600° F. In some examples, for process fluids having temperatures less than 450° F., the anti-extrusion ring 432 may not be used. As shown, the anti-extrusion ring 432 is disposed between the retainer 424 and the seal 430 and the seal 430 is disposed between the anti-extrusion ring 432 and the shoulder 426 formed by the stepped portion 418. The seal 430 engages a surface 434 (FIG. 4B) of the valve body 304 when the valve seat 302 (and the cage 314) is coupled to the valve body 304.

In operation, an actuator (e.g., a pneumatic actuator) moves the valve stem 318 and, thus, the closure member 316 between the closed position at which the closure member 316 is in sealing engagement with the valve seat 302 to restrict or prevent fluid flow through the fluid valve 300 and the fully open or maximum flow rate position at which the closure member 316 is spaced away from the valve seat 302 and the openings 322 of the cage 314 to allow fluid flow through the fluid valve 300. In the open position, fluid flows between the inlet 308, through the openings 322 of the cage and through the outlet 310. In the closed position, the closure member 316 obstructs the openings 322 of the cage 314 and the sealing surface 332 sealingly engages the valve seat 302 to prevent fluid flow between the inlet 308 and the outlet 310.

The seal assembly 422 provides a seal between the valve body 304 and the valve seat 302. Leakage between the valve body 304 and the valve seat 302 (and between the closure member 316 and the cage 314) may affect the shut-off classification of the fluid valve 300. The seal assembly 422 is disposed between the valve seat 302 and the valve body 304 to prevent leakage between the inlet 308 and the outlet 310 of the fluid valve 300 when the closure member 316 is in the closed position to improve the shut-off classification of the fluid valve 300.

Figure 5A:
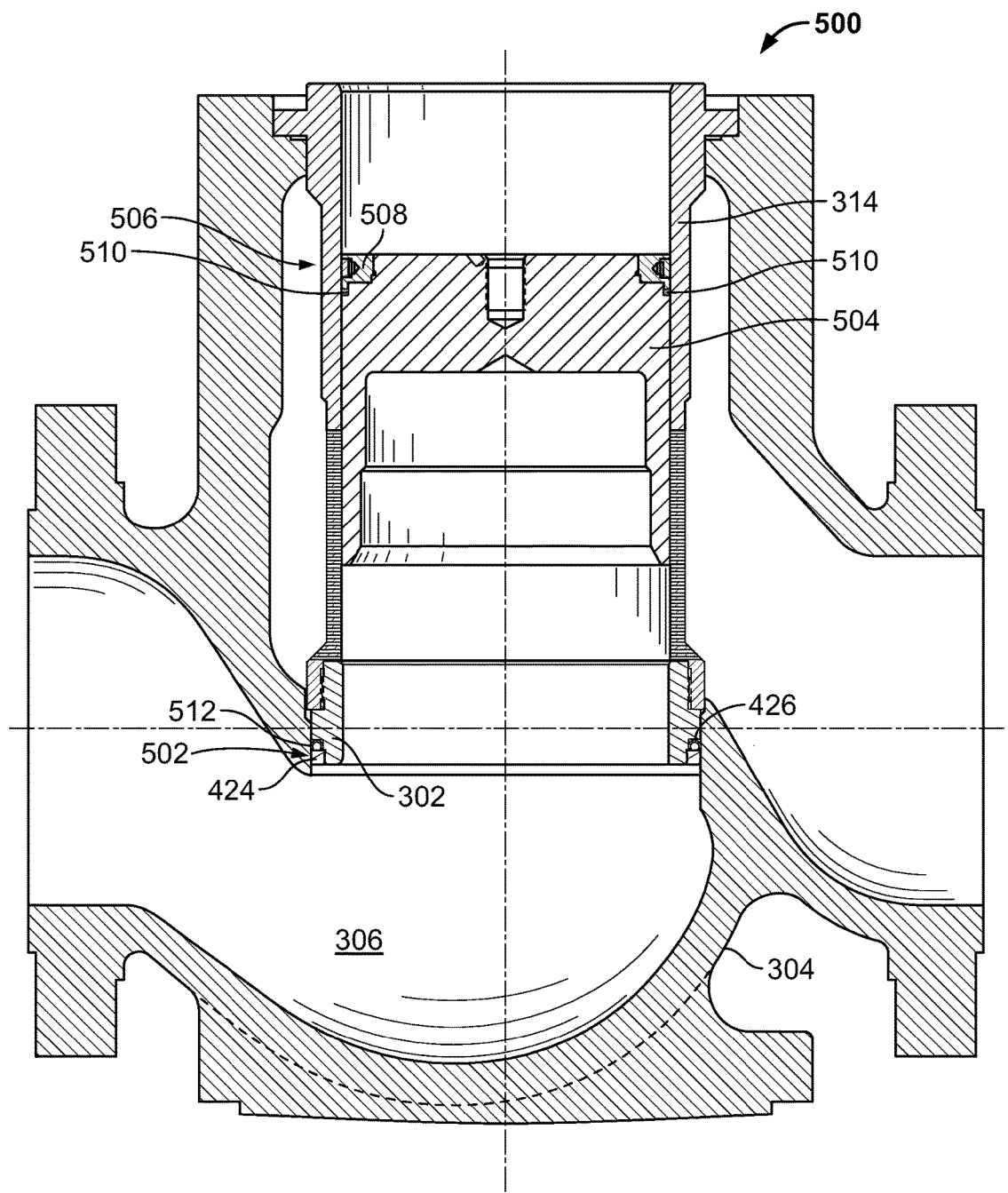
FIG. 5A illustrates another example valve implemented with another example valve seat apparatus described herein.
Figure 5B:
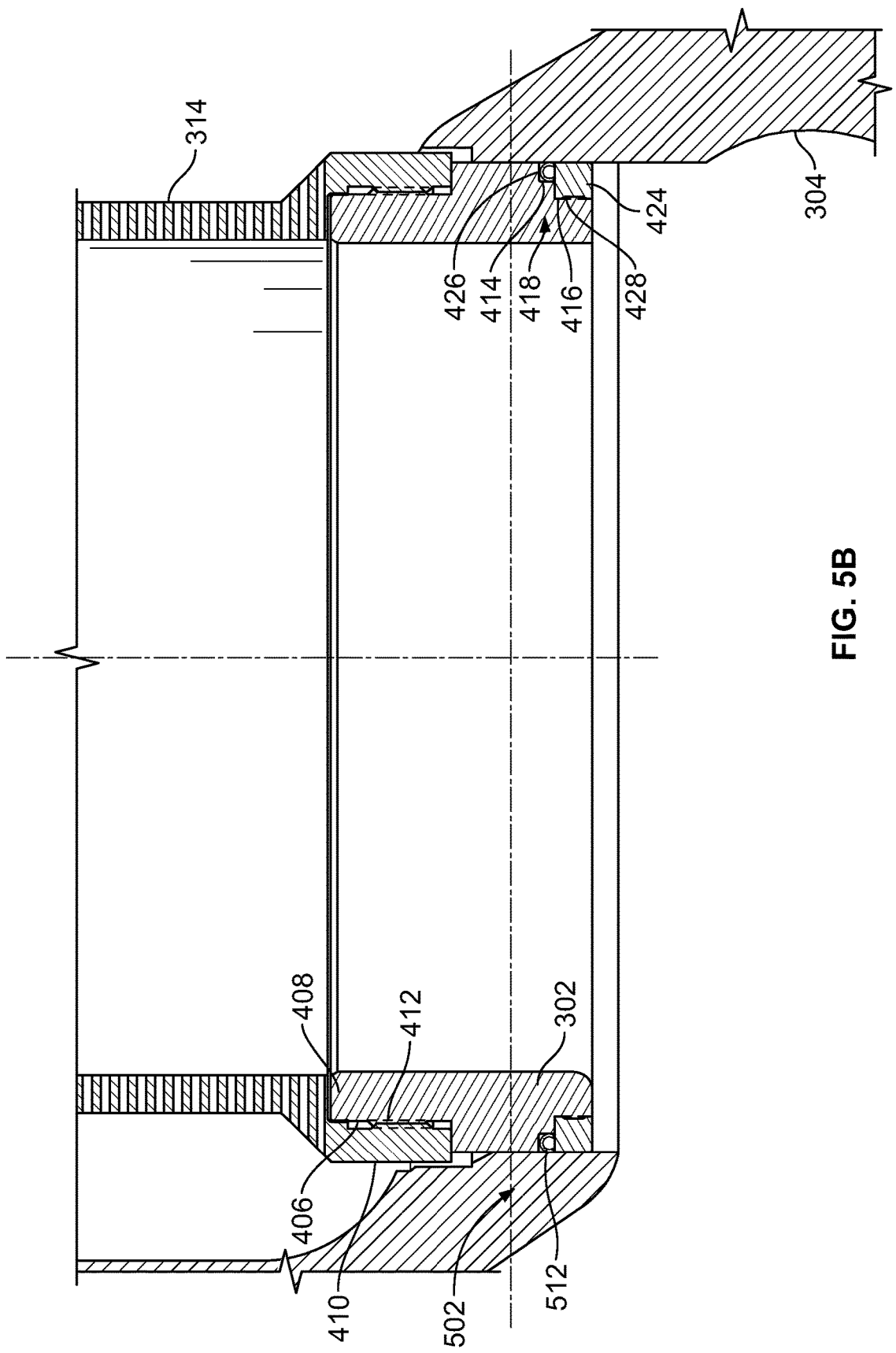
FIG. 5B is an enlarged portion of the example valve seat apparatus of FIG. 5A.

FIG. 5A illustrates an example fluid valve 500 implemented with the valve seat 302 of FIGS. 3, 4A and 4B, but having another example seal assembly 502. FIG. 5B illustrates an enlarged portion of the fluid valve 500 of FIG. 5B. Those components of the example valve 500 of FIGS. 5A and 5B that are substantially similar or identical to those components of the example fluid valve 300 described above and that have functions substantially similar or identical to the functions of those components will not be described in detail again below. Instead, the interested reader is referred to the above corresponding descriptions in connection with FIGS. 3, 4A and 4B. Those components that are substantially similar or identical will be referenced with the same reference numbers as those components described in connection with FIGS. 3, 4A and 4B. In particular, the example fluid valve 500 includes the valve body 304 of FIG. 3.

The example valve 500 is similar to the example fluid valve 300 of FIGS. 3 and 4. However, the example valve 500 may be used with process fluids having temperatures above about 600° F. A closure member 504 of the example valve 500 is implemented with a plug seal assembly 506. In this example, the plug seal assembly 506 of the closure member 504 includes a graphite piston ring 508 and a bore seal 510 (e.g., a C-shaped seal) that is made of metal or any other material, to provide relatively high resistance to leakage of process fluid between the closure member 504 and the valve body 304 for process fluids having relatively high temperatures (e.g., temperatures greater than about 600° F.).

Similar to the fluid valve 300 of FIGS. 3, 4A and 4B, the valve seat 302 is coupled to the cage 314 and is disposed within the valve body 304. The seal assembly 502 is disposed within the seal receiving area 414 of the valve seat 302. The retainer 424 is disposed within the retainer receiving area 416 to retain the seal assembly 422 between the shoulder or wall 426 of the stepped portion 418 and the retainer 424. In this example, the seal assembly 502 includes a bore seal 512 (e.g., a C-shaped seal) that is made of metal or any other material that is highly resistant to temperatures greater than 600° F. The bore seal 512 can resist such high temperatures and provides a seal between the valve seat 302 and the valve body 304. Depending on the flow direction of the fluid flowing through the passageway 306, the bore seal 512 may be disposed within the seal receiving area 414 with an opening of the bore seal 512 facing the direction of the fluid flow.

Figure 6:
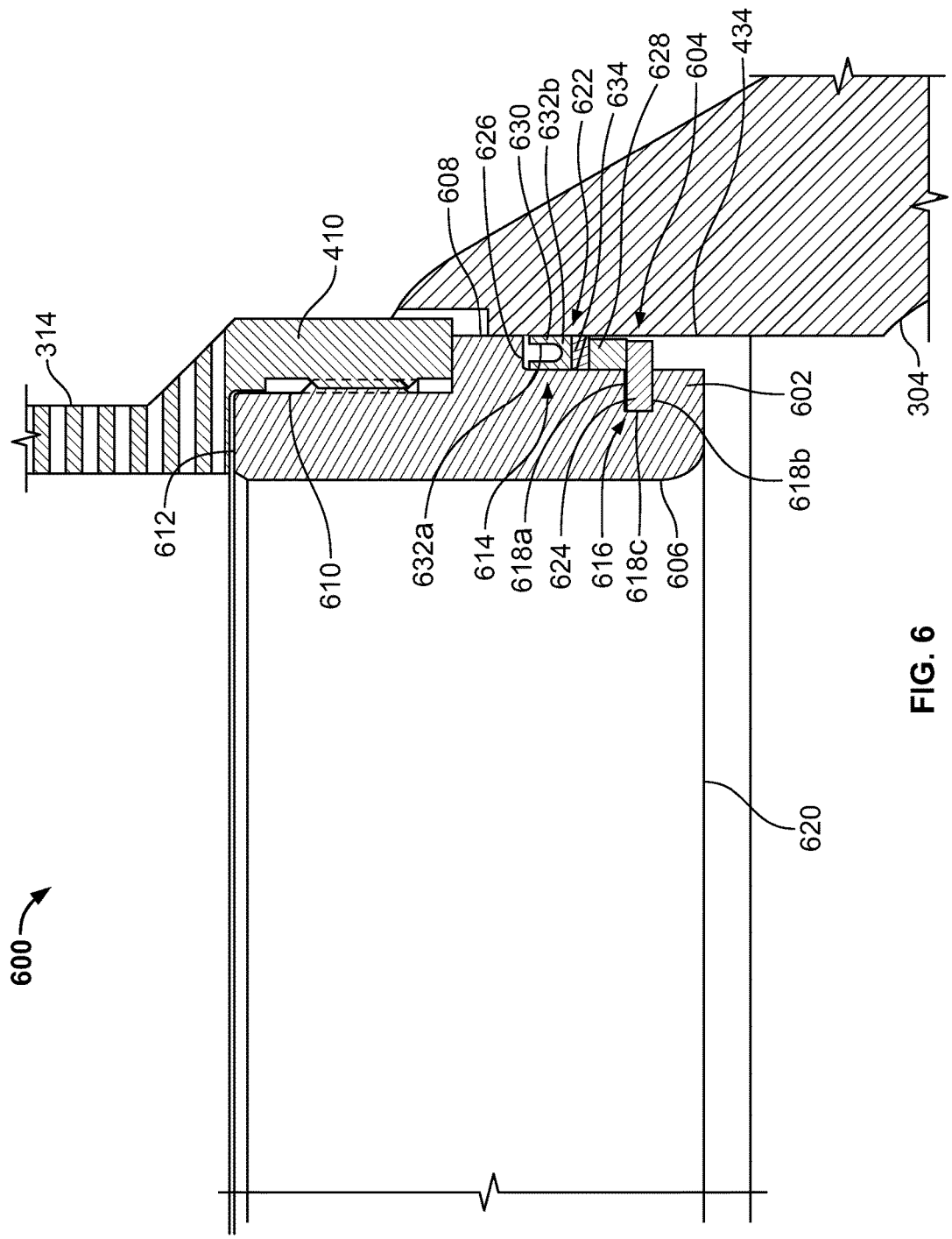
FIG. 6 is an enlarged portion of yet another example fluid valve implemented with another example valve seat apparatus described herein.

FIG. 6 illustrates an enlarged portion of yet another example fluid valve 600 implemented with another example valve seat 602 described herein that includes another example retaining apparatus 604. Those components of the example valve 600 of FIG. 6 that are substantially similar or identical to those components of the example fluid valves 300 or 500 described above and that have functions substantially similar or identical to the functions of those components will not be described in detail again below. Instead, the interested reader is referred to the above corresponding descriptions in connection with FIGS. 3, 4A, 4B, 5A and 5B. Those components that are substantially similar or identical will be referenced with the same reference numbers as those components described in connection with FIGS. 3, 4A, 4B, 5A and 5B. In particular, the example fluid valve 600 includes the valve body 304 of FIGS. 3, 5A and 5B.

As shown in FIG. 6, the valve seat 602 (e.g., a seat ring) includes an inner surface 606 and an outer peripheral edge or surface 608 having a main diameter. The outer surface 608 includes a recessed portion 610 adjacent a first end 612 of the valve seat 602 to receive the end 410 of the cage 314. In this example, the first end 612 of the valve seat 602 is threadably coupled to the end 410 of the cage 314.

The outer surface 608 of the valve seat 602 also includes a first annular recess or seal receiving area 614 and a second annular recess or retainer receiving area 616 (e.g., a cavity) adjacent the seal receiving area 614. The seal receiving area 614 has a reduced or sealing outer diameter formed via, for example, machining or any other suitable manufacturing process(es). The retainer receiving area 616 is an annular recess having opposing walls or shoulders 618a and 618b and wall 618c (e.g., an annular recess having a C-shaped cross-sectional shape). The retainer receiving area 616 is adjacent a second end 620 of the valve seat 602.

A seal assembly 622 is disposed within or slip-fit on the seal receiving area 614 of the valve seat 602 and a retainer 624 is disposed within the retainer receiving area 616 to retain the seal assembly 622 between a shoulder or wall 626 and the retainer 624. As shown in this example, the retainer 624 is a snap ring disposed within the retainer receiving area 616 of the valve seat 602. More specifically, the retainer 624 is at least partially disposed or captured between the opposing walls 618a and 618b. A back-up ring 628 may be included to further support the seal assembly 622 when disposed within the seal receiving area 616. The back-up ring 628 may include an inner diameter that is substantially similar to the outer diameter of the seal receiving area 614 and an outer diameter that is substantially similar to the outer surface 608 of the valve seat 602. When coupled to the valve seat 602, the retainer 624 and/or the back-up ring 628 and the shoulder 626 define a cavity to receive the seal assembly 622.

In the illustrated example, the seal assembly 622 includes a seal 630 (e.g., an O-ring) composed of an elastomeric or fluropolymer material such as, for example polytetrafluoroethylene having a spring 632a disposed therein to bias sides 632b of the seal 630 toward the outer surface 608 of the valve seat 602 and the surface 434 of the valve body 304. An anti-extrusion ring 634 (e.g., a hard plastic anti-extrusion ring) is provided to prevent the seal 630 from extruding between the valve seat 602 and the valve body 304 when the fluid valve 600 is used with process fluids having temperatures between about 450° F. and 600° F. In some examples, for process fluids having temperatures less than 450° F., the anti-extrusion ring 634 may not be used. As shown, the anti-extrusion ring 634 is disposed between the back-up ring 628 and the seal 630, and the seal 630 is disposed between the anti-extrusion ring 634 and the shoulder 626. The seal 630 engages the surface 434 of the valve body 304 when the valve seat 602 (and the cage 314) is coupled to the valve body 304. In other examples, the seal receiving area 614 may receive any other suitable seal assembly such as, for example, the seal assembly 422 (FIGS. 3, 4A and 4B) and/or the seal assembly 502 (FIGS. 5A and 5B).

The example valve seats 302 and 602 provide modular valve seats that can receive a first seal assembly (e.g., the seals 422, 630) for use with process fluids having temperatures between about −100° F. or lower and 450° F., a second seal assembly (e.g., the seals 422, 630 and the anti-extrusion rings 424, 634) for use with process fluids having temperatures between 450° F. and 600° F., and a third seal assembly (e.g., the seal assembly 502) for use with process fluids having temperatures between about 600° F. and 1100° F. or higher. As a result, the example valve seat apparatus described herein significantly reduces manufacturing costs and inventory costs associated with, for example, the fluid valves 100 and 200 of FIGS. 1 and 2, respectively. Thus, the valve seat apparatus described herein enables different seal assemblies to be used with the same valve seat/body configuration.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. A valve seat apparatus for use with a fluid valve comprising:
   a seat ring having an outer surface that includes:
      a first annular recess at a first end of the seat ring, the first annular recess to receive a portion of a cage,
      a second annular recess proximate a second end of the seat ring opposite the first end, the second annular recess defining a groove in the outer surface of the seat ring, and
      a third annular recess adjacent the second annular recess;
   a first seal assembly disposed in the third annular recess; and
   a retainer disposed in the second annular recess to retain the seal assembly in the third annular recess.

2. A valve seat apparatus as defined in claim 1, wherein the first end of the seat ring is to be threadably coupled to the cage.

3. A valve seat apparatus as defined in claim 1, wherein the retainer includes an anti-extrusion ring at least partially composed of plastic.

4. A valve seat apparatus as defined in claim 1, wherein the retainer is removable from the second annular recess to enable the seat ring to receive a second seal assembly different from the first seal assembly.

5. A valve seat apparatus as defined in claim 4, wherein the first or second seal assembly includes a polytetrafluoroethylene seal and an anti-extrusion ring.

6. A valve seat apparatus as defined in claim 5, wherein the first or second seal assembly is to be used with a process fluid having a temperature between about −100° F. and 600° F., and the other of the first or second seal assembly to be used with a process fluid having a temperature above 600° F.

7. A valve seat apparatus as defined in claim 1, wherein the first or second seal assembly includes a metal seal or a bore seal.

8. A valve apparatus comprising:
   a valve body defining a fluid flow passageway between an inlet and an outlet;
   a valve seat coupled to a cage at a first end of the valve seat and disposed within the fluid flow passageway, wherein an outer peripheral surface of the valve seat at a second end of the valve seat opposite the first end includes a seal receiving area and a retainer receiving area, the seal receiving area and the retainer receiving area having different diameters;
   a first interchangeable seal to be retained in the seal receiving area; and
   a retainer to be coupled to the retainer receiving area to retain the first interchangeable seal.

9. A valve apparatus as defined in claim 8, wherein the first interchangeable seal is for use with process fluids having temperatures less than 600° F., and further including a second interchangeable seal for use with process fluids having temperatures greater than 600° F.

10. A valve apparatus as defined in claim 8, wherein the first interchangeable seal includes a polytetrafluoroethylene seal and an anti-extrusion ring.

11. A valve apparatus as defined in claim 8, wherein the first interchangeable seal assembly includes a metal or bore seal.

12. A valve apparatus as defined in claim 8, further including a plug to move along an inner diameter of the cage, the plug to sealingly engage the valve seat.

13. A valve apparatus as defined in claim 12, further including an outer annular recess of the plug to receive a second interchangeable seal to seal an outer diameter of the plug to an inner diameter of the cage.

14. A valve apparatus as defined in claim 13, wherein the second interchangeable seal includes a graphite piston ring and a bore seal.

15. A valve apparatus as defined in claim 9, wherein the retainer receiving area includes an annular groove.

16. A valve apparatus as defined in claim 9, wherein the cage includes an outer diameter flange to engage an inner diameter recess of the valve body.

17. A valve seat comprising:
   a body defining an inner and outer diameter, the body having a first end and a second end opposite the first end;
   a first annular recess to receive an end of a trim cage, the first annular recess at least partially defining the first end of the body;
   a second annular recess to receive a retainer, the second annular recess at least partially defining the second end of the body; and
   a third annular recess proximate the second annular recess to receive an interchangeable seal assembly, the first and second annular recesses defining a step profile at the second end.

18. A valve seat as defined in claim 17, wherein the second annular recess has a smaller outer diameter than an outer diameter of the third annular recess.

19. A valve seat as defined in claim 17, wherein the second annular recess has a larger outer diameter than an outer diameter of the first annular recess.

20. A valve seat as defined in claim 17, wherein the interchangeable seal assembly includes a polytetrafluoroethylene seal and an anti-exrusion ring.

* * * * *